(12) United States Patent
Hernandez, Jr.

(10) Patent No.: US 12,494,603 B2
(45) Date of Patent: Dec. 9, 2025

(54) ACTIVE COVER PLATE

(71) Applicant: Alltrade Tools LLC, Cypress, CA (US)

(72) Inventor: Hector R. Hernandez, Jr., Fullerton, CA (US)

(73) Assignee: Alltrade Tools LLC, Cypress, CA (US)

( * ) Notice: Subject to any disclaimer, the term of this patent is extended or adjusted under 35 U.S.C. 154(b) by 217 days.

(21) Appl. No.: 18/223,491

(22) Filed: Jul. 18, 2023

(65) Prior Publication Data

US 2025/0030189 A1    Jan. 23, 2025

(51) Int. Cl.
H01R 13/447    (2006.01)
H01R 24/76     (2011.01)
H01R 25/00     (2006.01)

(52) U.S. Cl.
CPC ........... H01R 13/447 (2013.01); H01R 24/76 (2013.01); H01R 25/006 (2013.01)

(58) Field of Classification Search
None
See application file for complete search history.

(56) References Cited

U.S. PATENT DOCUMENTS

| | | | | |
|---|---|---|---|---|
| 1,785,463 A | * | 12/1930 | Strongson | H01R 25/006 439/536 |
| 4,143,931 A | * | 3/1979 | Skare | H01R 12/67 174/117 FF |
| 4,886,465 A | * | 12/1989 | Warner | H01R 13/4534 439/489 |
| 5,180,886 A | * | 1/1993 | Dierenbach | H02G 3/14 220/241 |
| 5,813,873 A | * | 9/1998 | McBain | H01R 13/443 439/732 |
| 6,916,989 B2 | * | 7/2005 | Broussard, Jr. | H02G 3/14 174/67 |
| 7,189,110 B1 | * | 3/2007 | Savicki, Jr. | H01R 25/003 439/535 |
| 8,668,347 B2 | * | 3/2014 | Ebeling | H01R 13/6641 174/67 |
| 2013/0032594 A1 | * | 2/2013 | Smith | H02G 3/14 220/241 |
| 2013/0118771 A1 | * | 5/2013 | Tonnesen | H02G 3/14 174/66 |
| 2013/0260613 A1 | * | 10/2013 | Misener | F21V 21/04 439/653 |
| 2014/0132084 A1 | * | 5/2014 | Pham | H01R 24/78 307/140 |
| 2019/0260151 A1 | * | 8/2019 | Shotey | H01R 13/512 |

* cited by examiner

Primary Examiner — Krystal Robinson
(74) Attorney, Agent, or Firm — Fulwider Patton LLP (57) ABSTRACT

An active cover plate is described for covering a power outlet, comprising a perimeter structure to cover a power outlet; a left conductor attached to the perimeter structure and defining a first conductive slot sized to receive a left electrical prong from an electrical appliance; a right conductor attached to the perimeter structure and defining a second conductive slot sized to receive a right electrical prong from an electrical appliance; a load attached to the perimeter structure, the load being electronically connected to the left conductor and the right conductor; when a left prong and a right prong of an electrical appliance are inserted through the left conductive slot and the right conductive slot to make contact with the left conductor and the right conductor, and thence are inserted into a power outlet, electrical power is extracted from the power outlet to energize the load.

10 Claims, 5 Drawing Sheets

ACTIVE COVER PLATE

FIELD OF THE INVENTION

The present invention relates to the field of active cover plates.

BACKGROUND

Figure 8:
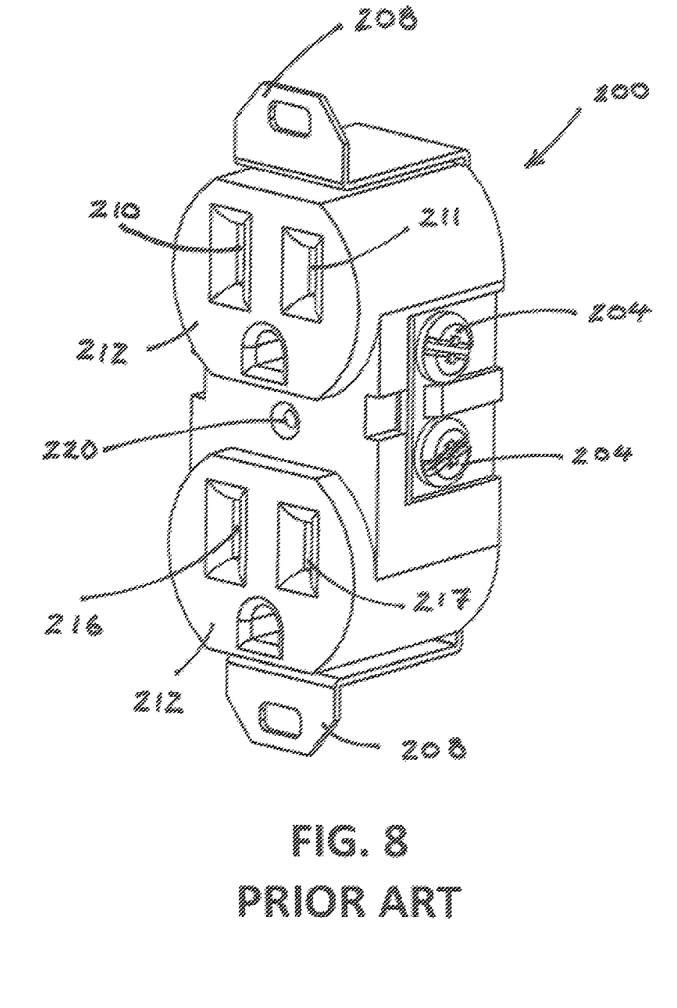
FIG. 8 shows an electric socket that is known in the prior art.

Certain active cover plates are known in the art. Such cover plates are manufactured to cover electric power outlet sockets, such as the outlet socket 200 that is shown in FIG. 8, which are present on the walls of most buildings. The electrical grid provides alternating current to the outlet socket. Electric outlet sockets are designed to provide a source of electric current to appliances used about the building such as vacuum cleaners, tools, table lamps, and the like. Up until recently, cover plates in the form of a simple sheet of plastic with openings sized to match the sockets such as sockets 200, were screwed onto a receptacle (not shown in the figures) to cover the socket and its receptacle and keep the contents safe.

More recently, active cover plates have been introduced which are built to include within them micro-circuitry including LED type lights, motion detectors, light detectors, loudspeakers, and many other appliances. The point of commonality in such known active cover plates is that they are configured to draw electrical current from screws, as seen as screws 204 in FIG. 8, on the sides of the socket 200, at a point to which a conductive wire carrying alternating current is affixed to the socket 200. The physical structures used by such active cover plates to connect to the screws 204, and hence to the current, on the sides of the socket are typically two flexible prongs made of conductive material and which are rearwardly facing towards the socket and spaced to be on the left and right sides of the socket. The artisan attaching a known active cover plate will first remove the original regular cover plate, set it aside, and then introduce the active cover plate by inserting the rearwardly facing prongs into the receptacle until each prong is in contact with a voltage-bearing screw 204 on either side of the outlet socket. The active cover plate will be attached in the same way as the regular cover plate was attached, that is with a screw or screws configured to screw into the existing screw holes 220 of the wall receptacle holding the socket. The socket 200 itself may be screwed, via flanges 208 with screw holes, into threaded screw holes in the receptacle (not shown in the figures).

However, problems have emerged in the prior art active cover plates. It has been found that by extracting electric power for the cover plate directly from the wires and screws 204 which supply the outlet device with electric power is often complicated by the fact that the electric wire on the side of the outlet is frequently bent into a small space, and does not present an easy point of connection for the rearwardly extending prongs. Further, the act of installation may expose the artisan, or homeowner, directly to 110 volts of potential difference while carrying out the installation-particularly where the artisan has not taken the precaution of turning off the supply of potential difference at the main power switchboard.

Thus, there is a need in the art for a system and method for effectively and rapidly installing an active cover plate over an electrical outlet without encountering a difficult wiring condition, and without any risk of exposing the artisan to an electric shock.

The presently described invention is a novel system and method that addresses these and other needs.

SUMMARY OF THE INVENTION

In one embodiment, the invention is an active cover plate for covering a power outlet. The active cover plate comprises a perimeter structure configured to cover a power outlet. A left conductor is provided, and is attached to the perimeter structure. The left conductor defines a first conductive slot sized to receive a left electrical prong from an electrical appliance. A right conductor is provided, and is attached to the perimeter structure. The right conductor defines a second conductive slot sized to receive a right electrical prong from an electrical appliance. A load is provided and is attached to the perimeter structure. The load being electronically connected to the left conductor and the right conductor. Under this configuration, when a left prong and a right prong of an electrical appliance are inserted through the left conductive slot and the right conductive slot to make contact with the left conductor and the right conductor respectively, and then, when the left prong and the right prong are inserted into a power outlet, electrical power is extracted from the power outlet to energize the load.

In some embodiments, the perimeter structure defines a first non-conductive slot having the same shape as the first conductive slot and which aligns with the first conductive slot.

In yet further embodiments, the active cover plate further includes an overlay configured to be attached to the perimeter structure so as to cover the left conductor and the right conductor. In such configurations, the overlay may be further configured to define a second non-conductive slot having the same shape as the first conductive slot and which, when the overlay is attached to the perimeter structure, aligns with the first conductive slot. Additionally, the overlay may be further configured to include embossments that mimic a profile of a standard outlet.

In embodiments of the active cover plate, the left conductor and the right conductor are strips of copper. In yet further embodiments, the first conductive slot and the second conductive slot each include a flexible tab formed integrally with the left conductor and the right conductor respectively.

In another embodiment the invention is a method for activating a cover plate, the cover plate including a perimeter structure configured to cover a power outlet and having a load attached to the perimeter structure. The method comprises providing a left conductor defining a left conductive slot sized to receive a left electrical prong of an electrical appliance. The left conductor is electronically connected to the load. A right conductor is provided, the right conductor defining a right conductive slot sized to receive a right electrical prong of an electrical appliance. The right conductor is electronically connected to the load. The perimeter structure is positioned to cover a power outlet. A left prong of an electrical appliance is passed through the left conductive slot to make an electronic contact between the left prong and the left conductor. Simultaneously, a right prong of an electrical appliance is passed through the right conductive slot to make an electronic contact between the right prong and the right conductor. The left prong and the right prong are passed into a power outlet. Under this configuration of steps, electrical power is extracted from the power outlet to energize the load.

In some embodiments, the step of passing a left prong of an electrical appliance through the left conductive slot includes making contact between the left prong and a flexible conductive tab that is integrally formed with the left conductor.

In further embodiments, the step of passing a left prong of an electrical appliance through the left conductive slot includes passing the left prong through a first non-conductive slot formed in the perimeter structure, the first non-conductive slot being sized to receive the left prong.

In further embodiments, the method includes the further step of attaching an overlay to the perimeter structure thereby enclosing the left conductor and the right conductor between the perimeter structure and the overlay. Under this configuration, passing a left prong of an electrical appliance through the left conductive slot includes passing the left prong through a first non-conductive slot formed in the overlay, the first non-conductive slot being sized to receive the left prong.

These and other advantages of the invention will appear from the detailed description of the drawings and the embodiments.

DETAILED DESCRIPTION OF THE DRAWINGS

DETAILED DESCRIPTION OF THE PREFERRED EMBODIMENTS

In the following detailed description, certain preferred embodiments are described in order to provide a thorough understanding of the present invention.

The invention comprises, in one embodiment, an active cover plate which is configured to be attached to cover a socket outlet 200 such as that shown in FIG. 8. Similar to known active cover plates, the invention may include built in micro-circuitry including LED type lights, motion detectors, light detectors, loudspeakers, and many other appliances. Unlike the active cover plates known in the prior art however, the invention does not draw current for its micro-circuitry using rearwardly extending conductive prongs that are fixedly built onto the cover plate and that are configured to make contact with screws on the sides of the outlet device, at a point where current from a 110 volt supply reaches the outlet-such as screws 204 in FIG. 8. Rather, as will be described in detail here, the invention is configured to function with useful and novel structure that avoids the problems in the prior art identified above.

Figure 1:
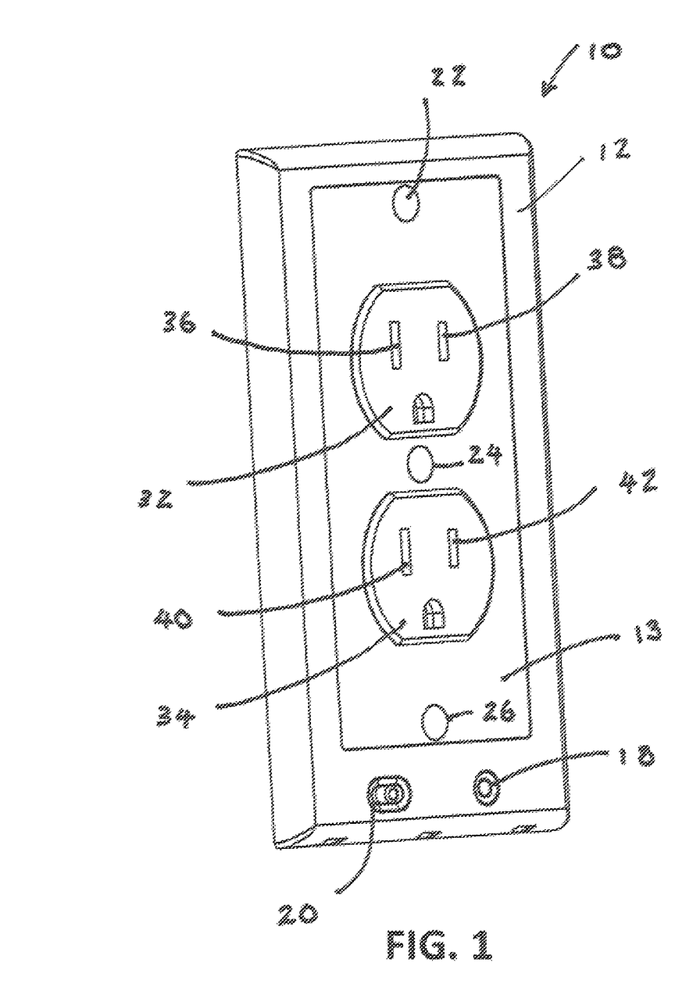
FIG. 1 shows an elevational view in front perspective of an embodiment of the invention.
Figure 2:
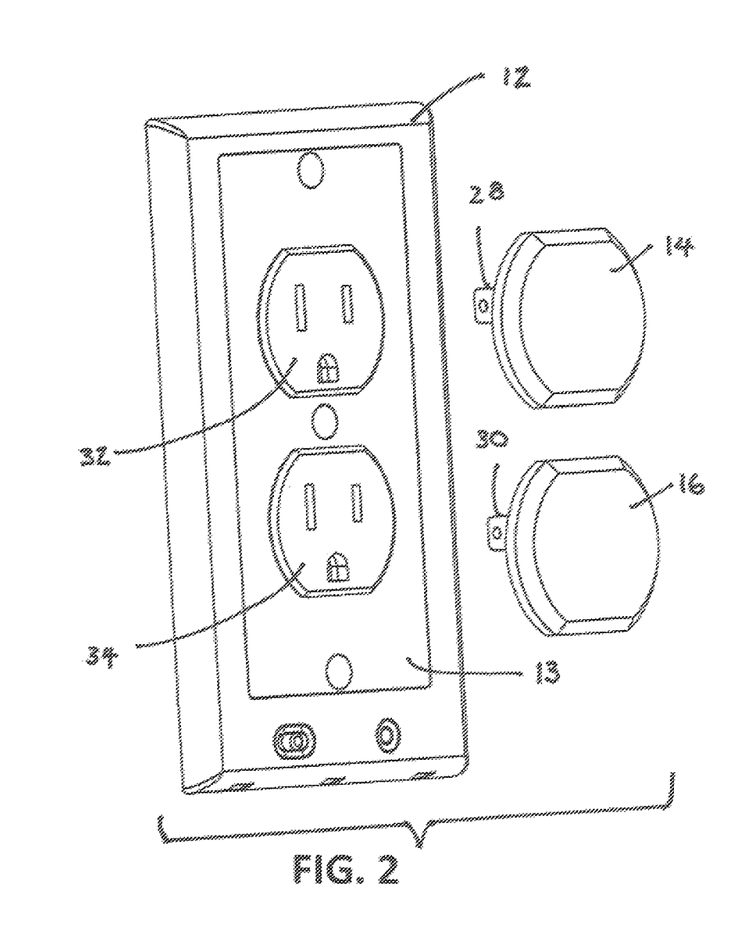
FIG. 2 shows the embodiment of FIG. 1, in relation to two dongles configured with prongs for insertion into a socket of the embodiment of FIG. 1.

FIG. 1 shows an embodiment of the invention, an active cover plate 10. FIG. 2 shows the cover plate 10, in association with dongles 14, 16, which may be used in association with the invention in a manner described below.

The embodiment of FIG. 1 shows the cover plate 10 as it would be seen by a consumer. A perimeter structure 12 defines the perimeter of the cover plate 10, and carries, attached to it, all the additional components of the cover plate 10. The perimeter structure 12 is formed from a moldable polymer in a manner known in the art. The perimeter structure may include an "on-off switch" 20, which is a feature on active cover plates that are known in the art. It also may include a motion sensor (or a light sensor) 18, which are both well known in the art. FIG. 1 shows the cover plate 10 having openings 22, 24, 26 which may be used for fastening the cover plate with screws to an outlet socket 200 such as shown in FIG. 8 via threaded holes 220. The openings may be sealable with plugs (not shown in the figures).

In order to assist in clarifying how the invention operates, two cooperating dongles 14, 16 are shown in FIG. 2, each having a set of two conductive prongs. Dongle 14 has two prongs 28 (only one shown in FIG. 2 but both shown in FIG. 6) and dongle 16 has two prongs 30 (only one shown in FIG. 2 but both shown in FIG. 6). Prong sets 28 are not electronically connected to each other within dongle 14, and the same applies with sets 30 in dongle 16. Their function will be explained further below but broadly, their function is to play the same role as can be played by power inlet prongs of an ordinary electrical appliance, such as a vacuum cleaner, which is plugged into the cover plate 10. In other words, the dongles may play the role of small electrical appliances as will become apparent.

Figure 3:
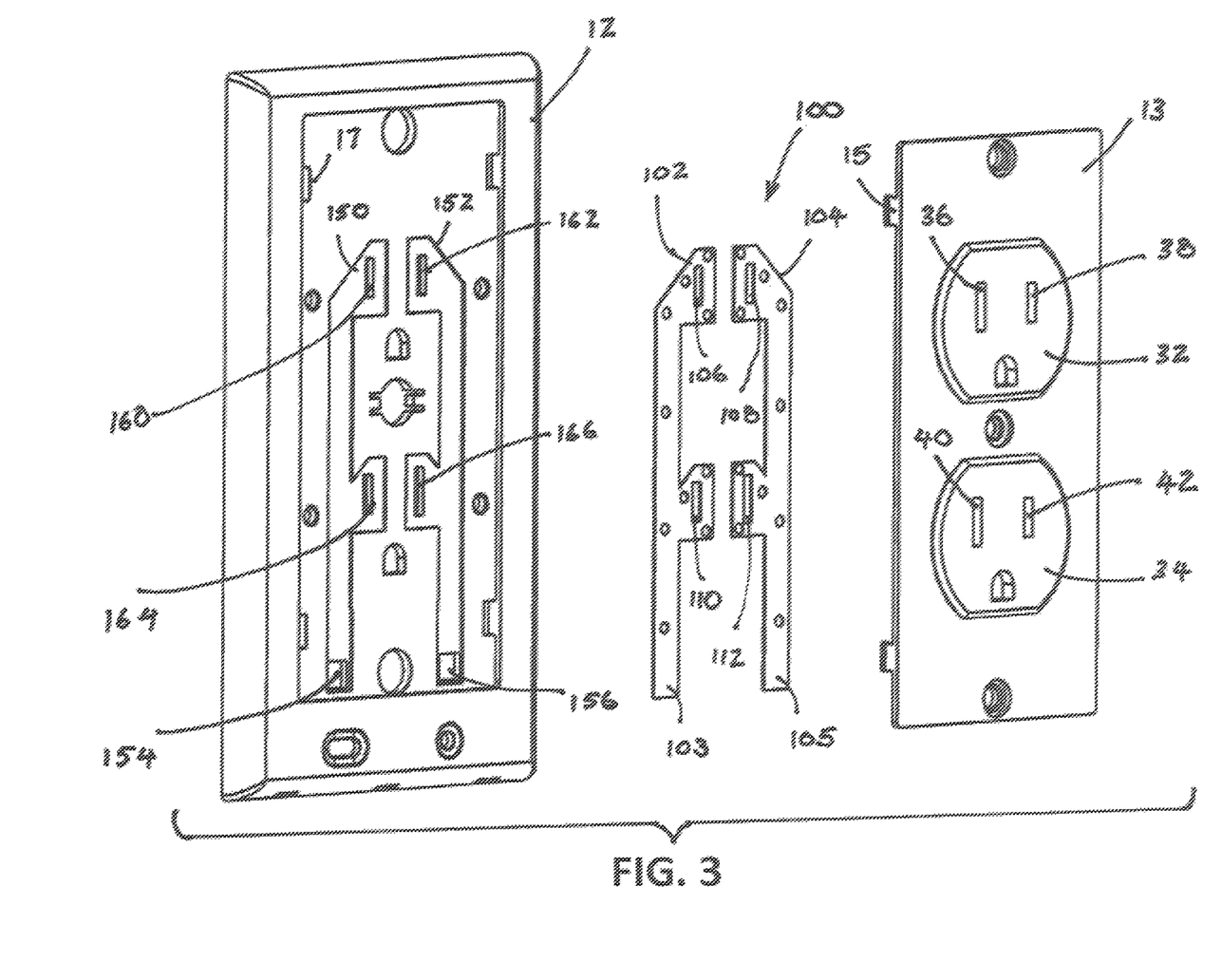
FIG. 3 shows a horizontally exploded view of three forward components of the embodiment of FIG. 1.

FIG. 3 is an exploded view of three forward components of the cover plate 10. First, a rectangular overlay 13 in the front on the right is attachable and removable from the perimeter structure 12 behind it, to sandwich and protect some of the electronics in the cover plate. The overlay 13 is formed from a moldable polymer in a manner known in the art. The overlay 13 may be attached to the front face of the perimeter structure 12 by male detents 15 configured to mate with female detents 17 on the perimeter plate 12. The overlay 13 defines two embossments 32, 34 which are shaped to mimic the sockets 212 of a standardized outlet socket (such as that shown in FIG. 8) contained within a receptacle in a wall. Each embossment 32, 34 defines two slots 36, 38 and 40, 42 respectively, which are shaped to receive the prong sets 28 and 30 of each dongle 14, 16 which are shown in FIG. 2. The prongs 28, 30 of the dongles are in turn shaped to mimic the standardized prongs that are provided with most US appliances, capable of receiving 110 volts from the power grid via standard outlet sockets. Thus, the slots 36, 38 and 40, 42 will be sized to receive either the prongs 28, 30 of the dongles, or standard prongs from standard US 110 volt appliances (not shown in the figures). The user will be able to utilize the dongles in a situation where there is no standard appliance being used or available.

Continuing with reference to FIG. 3, some electronic components 100 of the cover plate 10 are described. Components 100 include two conductive strips 102, 104 which are provided, each made of conductive material such as copper. Collectively, the strips define a total of four conductive slots, 106, 108 and 110, 112. Conductive slots 106, 108 are sized identically to non-conductive slots 36, 38 of the overlay 13 and slots 110, 112 are sized identically to non-conductive slots 40, 42 of the overlay 13. Conductive slots 106, 110 are formed in left strip 102; and, conductive slots 108, 112 are formed in right strip 104. The electronic relationship between left strip 102 and right strip 104 are described below.

Still continuing with reference to FIG. 3, the perimeter structure 12, being formed of moldable polymer in a known manner, is formed to define two depressions, a left depression 150 and a right depression 152. The left depression 150 is shaped to receive the left strip 102, and the right depression 152 is shaped to receive the right strip 104. Each depression defines a set of molded non-conductive slots 160, 162, and 164, 166 with each slot being sized identically to slots 36, 38 and slots 40, 42 of the overlay 13 respectively. At the lower end of each depression, a window is formed, a left window 154 in left depression 150, and a right window 156 in right depression 152. The purpose of the windows 154, 156 will be described below.

Once the perimeter structure 12, the overlay 13, and the strips 102, 104 are assembled in relation to each other, with the strips embedded in the depressions 150, 152, and the overlay 13 attached to the perimeter structure 12, all of the respective conductive and non-conductive slots will "line up" so that slots 160, 106, 36 will all align, slots 162, 108, 38 will align, slots 164, 110, 40 will align, and slots 166, 112, and 42 will align. Thus, the prongs 28, 30 on the dongles 14, 16 (or the prongs of any standard appliance) will pass without interruption through these aligned sets of slots, and will be capable of extending into the two slots of an outlet socket—such as socket 200 in FIG. 8 with its slots 210, 211 and 216, 217—when the cover plate 10 is positioned on a wall in front of the socket 200. The functional significance of this aspect of the invention's geometry will be described further below.

Figure 4:
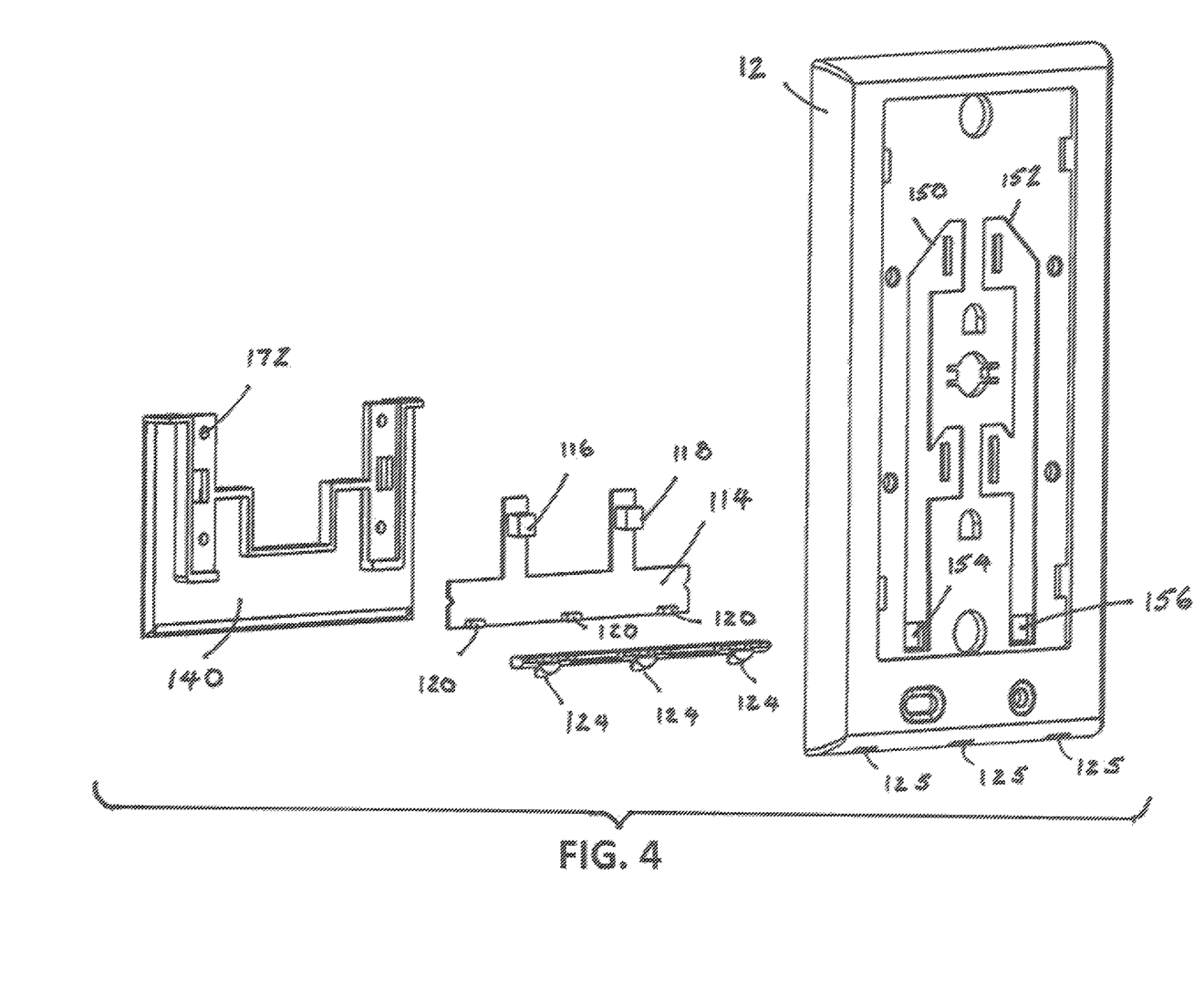
FIG. 4 shows a horizontally exploded view of four rearward components of the embodiment of FIG. 1; this view shows one component that is commonly shown in FIG. 3 for clarity of the arrangement of components.

Reference is now made to FIG. 4 in continuing to describe the remaining features of this embodiment of the invention. In this figure four rearward components of the embodiment are shown in exploded relationship to each other. At the forefront of the figure, and in common with FIG. 3 to facilitate understanding of the sequencing of the elements, is the perimeter structure 12 shown in order to maintain the sequence of components of the invention. Behind the perimeter structure is a conductive support element 114 which has two contact points 116 and 118, each sized to pass through the apertures 154, 156 which are positioned at the bottom of the depressions 150, 152 in the perimeter structure 12 and to make contact with the bottom portions 103, 105 of the strips 102, 104.

The electric load in this embodiment takes the form of LEDs 120 (light emitting devices) which are known, and which consume a very low electric power draw, and at the same time give off a high level of lumens. In this embodiment, three LEDs 120 are shown connected to the support element 114 which has conductive properties.

Figure 5:
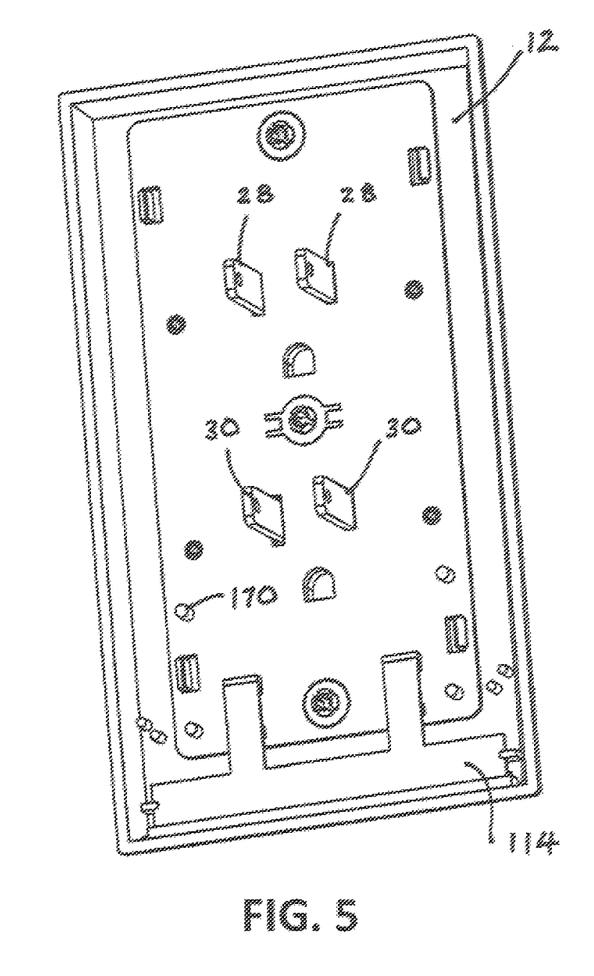
FIG. 5 shows an elevational view in rear perspective of the embodiment of FIG. 1, partially disassembled to show certain structure within the embodiment.

In use, the support element 114 is positioned against the interior surface of the perimeter element 12 as seen in FIG. 5. As may be envisaged, the contact points 116, 118 pass through the apertures 154, 156 and make contact with the bottom portions 103, 105 of the left strip 102 and the right strip 104 respectively which reside in the depressions 150, 152, thus passing on any potential difference between the conductive slots to the LEDs 120. Although the detailed circuitry for passing current through the support element 114 and through the LEDs is not shown in detail in the figures, this electronic aspect of distributing voltage to separate LEDs is well understood in the art of existing active cover plates, and one of ordinary skill in the art would understand its features. As shown in FIG. 4, the LEDs are configured to be placed against transparent lenses 124 which are exposed to the exterior of the perimeter structure 12 via apertures 125 in the perimeter structure 12, thus projecting beams of light from the LEDs downwards onto the wall and floor in the vicinity of the operating active cover plate 10.

FIG. 4 includes at the rear of the exploded view a backing element 140, configured to attach the support element 114 against the rear of the perimeter plate 12. This attached configuration is shown in FIG. 6.

Figure 6:
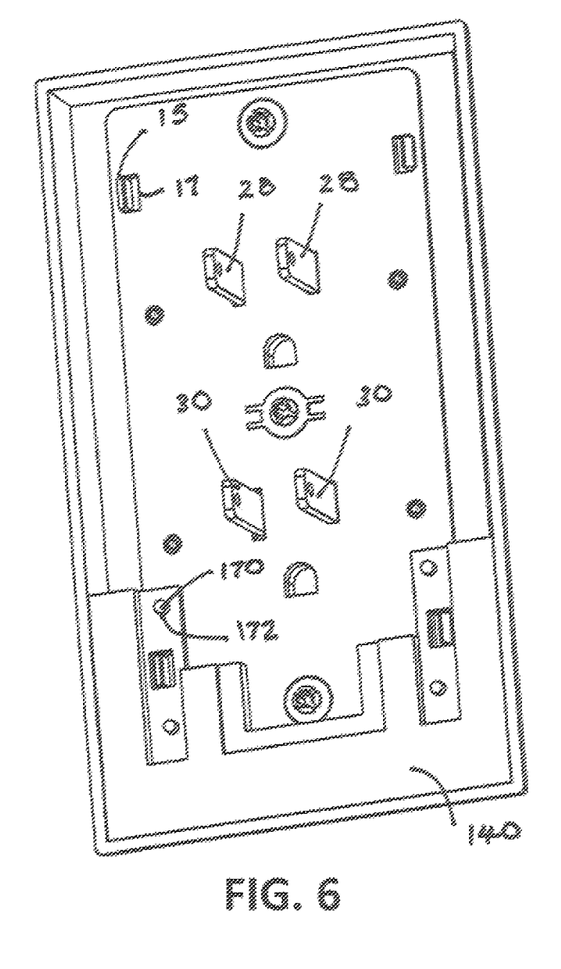
FIG. 6 shows an elevational view in rear perspective of the embodiment of FIG. 1 in fully assembled condition.

As further shown in FIG. 6, the support element 114 is enclosed by the backing element 140 which sandwiches the support element 114 between the backing element 140 and the perimeter structure 12. Molded elements may be attached to each other by detents in the form of pegs 170 and holes 172 of a kind well known in the art.

In use

Thus, the components of the invention and the relationship between them has been described. The function of the invention can be readily understood based on the structure described, and the following explanation.

Once the assembled cover plate 10 has been installed in front of a wall socket outlet (such as socket 200 in FIG. 8), the user may wish to activate the LEDs 120 or any other load that has been provided. In order to do so, the user ensures that the on-off switch 20 is "on." At this point the "on" switch my be over-ridden by a light sensor switch or a motion sensor switch 18, but it will be assumed for the following explanation that these switches are also in the "on" condition.

The user may insert the prongs 28 or 30 of a dongle 14 or 16, or indeed the user may insert any electrical inlet prongs of any standard appliance, into the slot sets 36, 38, or 40, 42 (or into both sets.) Whatever set of slots are chosen, the result will be the same. If it is assumed that a dongle is inserted into outlet embossment 32 as shown in FIG. 6, the prongs 28 will first penetrate non-conductive slots 36, 38, thence will penetrate conductive slots 106, 108, then will penetrate non-conductive slots 160, 162, and then finally will penetrate the slots 210, 211 of the outlet socket 200 as shown in FIG. 8, the latter of which may be charged with 110 volt potential difference.

As will be appreciated by one of ordinary skill, the potential difference in the outlet socket 200 will create a potential difference between the prongs 28. Further, this configuration, in which the conductive prongs 28 pass through and are thus in contact with the edges of conductive slots 106, 108 allows the 110 volts of potential difference to pass across the strips 102, 104 and thence, via the contact points 116, 118 into and across the support element 114, from where the potential difference is imposed across the LEDs 120 (or for any other load that is provided) to cause them to shine down photons of light upon the space around the active cover plate 10. Naturally, the motion sensor or light sensor may turn off the applied voltage, but it may also turn it back on again, depending on the switch override settings.

The net result is that the active cover plate 10 of the invention can be easily installed on a wall outlet socket without the user having to expose, or come into contact with, the main wiring inside the receptacle. It is thus safer than prior art active cover plates, because it relies on an appliance prong that must in any event be inserted into the wall socket outlet to make the appliance work. Alternatively, if the user does not wish to leave a regular appliance plugged into the active cover plate 10, they may simply plug in a dongle which has been provided with the cover plate. As can be appreciated, the prongs of the dongle will work in exactly the same way as the prongs of a regular appliance without the inconvenience of a large appliance left plugged into the socket.

Figure 7:
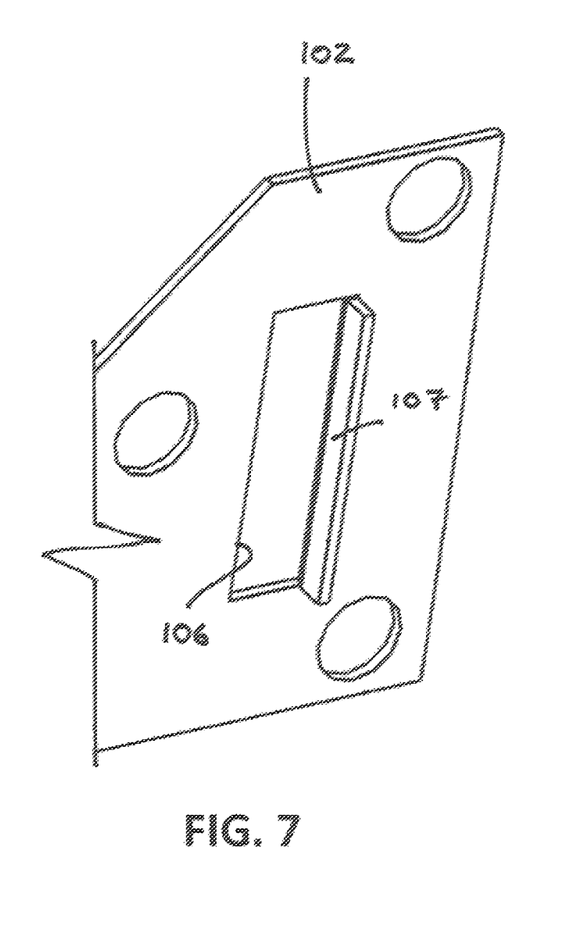
FIG. 7 shows a detail of structure shown in FIG. 3.

In a further aspect of the invention, the connection between prongs 28, and prongs 30 that are inserted through the conductive slots 106, 108 and 110, 112 respectively may be enhanced by an additional feature. Reference to FIG. 7 shows an enlarged detail of left strip 102 with its slot 106, which, in this embodiment, is configured to include a cantilevered flexible tab 107 which protrudes partially across the slot 106 and is flexibly connected to the strip 102 along an edge of the slot 106. The result of this feature is to ensure that when a prong 28 is passed through the slot 106 a more secure electrical connection is formed between the prong 28 and the strip 102. The connection is enhanced because the cantilevered tab 107, if set at the right angle of protrusion, introduces a permanently biased contact force against the prong and even allows for variations in the thickness of the prong 28 while continuing to maintain a good connection even if the prong 28 is below standard thickness, due to manufacturing tolerances and the like.

Method

In another embodiment, the invention is a method for activating a cover plate 10, in which the cover plate includes a perimeter structure 12 configured to cover a power outlet and has a load 120 attached to the perimeter structure. The method comprises providing a left conductor 102 defining at least one left conductive slot 106 sized to receive a left electrical prong of an electrical appliance. The left conductor is electronically connected to the load. Further, a right conductor 104 is provided. The right conductor defines a right conductive slot 108 sized to receive a right electrical prong of an electrical appliance. The right conductor is electronically connected to the load 120. The perimeter structure is positioned to cover a power outlet socket. A left prong 28 of an electrical appliance is passed through the left conductive slot 106 to make an electronic contact between the left prong and the left conductor 102. Simultaneously, a right prong 28 of an electrical appliance is passed through the right conductive slot 108 to make an electronic contact between the right prong and the right conductor 104. At this point, the left prong and the right prong are passed into a power outlet socket. It will be appreciated by one of ordinary skill that this action will cause electrical power to be extracted from the power outlet to energize the load.

In some embodiments, the step of passing a left prong of an electrical appliance through the left conductive slot 106 includes also passing the left prong through a first non-conductive slot 160 formed in the perimeter structure 12, the first non-conductive slot being sized to receive the left prong. In yet further embodiments, this step may also include passing the left prong through a second non-conductive slot 36 formed in an overlay structure, the second non-conductive slot being sized to receive the left prong.

Although preferred illustrative variations of the present invention are described above, it will be apparent to those skilled in the art that various changes and modifications may be made thereto without departing from the invention. It is intended in the appended claims to cover all such changes and modifications that fall within the scope of the invention as set forth in the claims.

I claim:

1. An active cover plate for covering a power outlet, comprising:
   a perimeter structure configured to cover a power outlet;
   a left conductor attached to the perimeter structure and defining a first conductive slot sized to receive a left electrical prong from an electrical appliance;
   a right conductor attached to the perimeter structure and defining a second conductive slot sized to receive a right electrical prong from an electrical appliance;
   a load attached to the perimeter structure, the load being electronically connected to the left conductor and the right conductor,
   whereby, when a left prong and a right prong of an electrical appliance are inserted through the left conductive slot and the right conductive slot to make contact with the left conductor and the right conductor respectively, and then when the left prong and the right prong are inserted into a power outlet, electrical power is extracted from the power outlet to energize the load;
   wherein the perimeter structure defines a first non-conductive slot having the same shape as the first conductive slot and which aligns with the first conductive slot.

2. An active cover plate for covering a power outlet, comprising:
   a perimeter structure configured to cover a power outlet;
   a left conductor attached to the perimeter structure and defining a first conductive slot sized to receive a left electrical prong from an electrical appliance;
   a right conductor attached to the perimeter structure and defining a second conductive slot sized to receive a right electrical prong from an electrical appliance;
   a load attached to the perimeter structure, the load being electronically connected to the left conductor and the right conductor,
   whereby, when a left prong and a right prong of an electrical appliance are inserted through the left conductive slot and the right conductive slot to make contact with the left conductor and the right conductor respectively, and then when the left prong and the right prong are inserted into a power outlet, electrical power is extracted from the power outlet to energize the load;
   further including an overlay configured to be attached to the perimeter structure so as to cover the left conductor and the right conductor.

3. The active cover plate of claim 2, wherein the overlay is further configured to define a second non-conductive slot having the same shape as the first conductive slot and which, when the overlay is attached to the perimeter structure, aligns with the first conductive slot.

4. The active cover plate of claim 2, wherein the overlay is further configured to include embossments that mimic a profile of a standard outlet.

5. An active cover plate for covering a power outlet, comprising:
   a perimeter structure configured to cover a power outlet;
   a left conductor attached to the perimeter structure and defining a first conductive slot sized to receive a left electrical prong from an electrical appliance;
   a right conductor attached to the perimeter structure and defining a second conductive slot sized to receive a right electrical prong from an electrical appliance;
   a load attached to the perimeter structure, the load being electronically connected to the left conductor and the right conductor,
   whereby, when a left prong and a right prong of an electrical appliance are inserted through the left conductive slot and the right conductive slot to make contact with the left conductor and the right conductor respectively, and then when the left prong and the right prong are inserted into a power outlet, electrical power is extracted from the power outlet to energize the load;

wherein the left conductor and the right conductor are strips of copper.

6. A method for activating a cover plate, the cover plate including a perimeter structure configured to cover a power outlet and having a load attached to the perimeter structure, the method comprising:

providing a left conductor defining a left conductive slot sized to receive a left electrical prong of an electrical appliance;

electronically connecting the left conductor to the load;

providing a right conductor defining a right conductive slot sized to receive a right electrical prong of an electrical appliance;

electronically connecting the right conductor to the load;

positioning the perimeter structure to cover a power outlet;

passing a left prong of an electrical appliance through the left conductive slot to make an electronic contact between the left prong and the left conductor; and simultaneously passing a right prong of an electrical appliance through the right conductive slot to make an electronic contact between the right prong and the right conductor; and passing the left prong and the right prong into a power outlet;

thereby, extracting electrical power from the power outlet to energize the load;

wherein passing a left prong of an electrical appliance through the left conductive slot includes passing the left prong through a first non-conductive slot formed in the perimeter structure, the first non-conductive slot being sized to receive the left prong.

7. A method for activating a cover plate, the cover plate including a perimeter structure configured to cover a power outlet and having a load attached to the perimeter structure, the method comprising:

providing a left conductor defining a left conductive slot sized to receive a left electrical prong of an electrical appliance;

electronically connecting the left conductor to the load;

providing a right conductor defining a right conductive slot sized to receive a right electrical prong of an electrical appliance;

electronically connecting the right conductor to the load;

positioning the perimeter structure to cover a power outlet;

passing a left prong of an electrical appliance through the left conductive slot to make an electronic contact between the left prong and the left conductor; and simultaneously passing a right prong of an electrical appliance through the right conductive slot to make an electronic contact between the right prong and the right conductor; and passing the left prong and the right prong into a power outlet;

thereby, extracting electrical power from the power outlet to energize the load;

including the further step of attaching an overlay to the perimeter structure thereby enclosing the left conductor and the right conductor between the perimeter structure and the overlay.

8. The method of claim 7, wherein passing a left prong of an electrical appliance through the left conductive slot includes passing the left prong through a first non-conductive slot formed in the overlay, the first non-conductive slot being sized to receive the left prong.

9. An active cover plate for covering a power outlet, comprising:

a perimeter structure configured to cover a power outlet;

a left conductor attached to the perimeter structure and defining a first conductive slot sized to receive a left prong from an electrical appliance;

a right conductor attached to the perimeter structure and defining a second conductive slot sized to receive a right prong from an electrical appliance;

a load attached to the perimeter structure, the load being electronically connected to the left conductor and the right conductor, wherein, a left prong and a right prong of an electrical appliance are insertable through the left conductive slot and the right conductive slot to make contact with the left conductor and the right conductor respectively, and further wherein the left prong and the right prong are insertable into a power outlet with openings having a potential difference between them, thereby creating a circuit having a potential difference between the left prong and the right prong, thereby creating a potential difference between the left conductor and the right conductor, and thereby creating a potential difference across the load such that electrical power is extracted from the power outlet to energize the load, and further wherein the left prong and the right prong are removable from the power outlet, whereby the potential difference between the left prong and the right prong is removed from the circuit and the load is not energized.

10. A method for activating a cover plate, the cover plate including a perimeter structure configured to cover a power outlet and having a load attached to the perimeter structure, the method comprising:

providing a left conductor defining a left conductive slot sized to receive a left prong of an electrical appliance;

electrically connecting the left conductor to the load;

providing a right conductor defining a right conductive slot sized to receive a right prong of an electrical appliance;

electrically connecting the right conductor to the load;

positioning the perimeter structure to cover a power outlet;

passing a left prong of an electrical appliance through the left conductive slot to make an electrical contact between the left prong and the left conductor; and simultaneously passing a right prong of an electrical appliance through the right conductive slot to make an electrical contact between the right prong and the right conductor; and passing the left prong and the right prong into a power outlet with left and right openings having a potential difference between them; thereby creating a circuit having a potential difference between the left prong and the right prong, a potential difference between the left conductor and the right conductor, and a potential difference across the load, and thereby extracting electrical power from the power outlet to energize the load; and further removing the left prong and the right prong from the power outlet, and thereby removing the potential difference from between the left prong and the right prong, whereby the load is not energized.

* * * * *